United States Patent Office 3,320,245
Patented May 16, 1967

3,320,245
DERIVATIVES OF PHENOTHIAZINE-10-GLYOXYL-
IC ACIDS AND INTERMEDIATES IN THE PREP-
ARATION THEREOF
Milton Wolf, Chester, and Francis J. Greek, Philadelphia,
Pa., assignors to American Home Products Corpora-
tion, New York, N.Y., a corporation of Delaware
No Drawing. Filed Aug. 21, 1964, Ser. No. 391,288
26 Claims. (Cl. 260—243)

This invention is concerned with derivatives of pheno-thiazine-10-glyoxylic acids and with phenothiazine-10-glyoxyloyl chloride intermediates occurring in their preparation.

The claimed phenothiazine-10-glyoxylic acid derivatives exert central nervous system activity, as evidenced by pharmacological evaluation in warm blooded animals according to standard test procedures. Inter alia, these compounds also have been found to exhibit mydriatic, anticonvulsant, anti-Parkinsonian, analgesic, anti-inflammatory, central nervous system depressant and stimulant activities.

The pharmacologically useful compounds of the invention are represented by the formula appearing hereinafter:

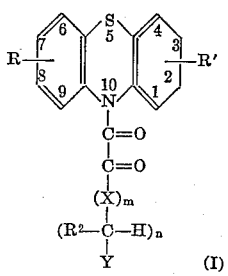

wherein: R and R' may be the same or different and are hydrogen; lower alkanoyl; (lower)alkyl; phenyl and phenyl(lower)alkyl such as phenethyl; halogen; (lower)-alkoxy; halo(lower)alkyl; sulfamyl; carbalkoxy having up to 4 carbon atoms; cyano; di(lower)alkylamino; (lower) alkanoylamino; X is oxygen, imino, (lower)alkylimino, or sulfur; Y is amino, di(lower)alkylaminoalkyl, di-(lower)alkylamino, 1 - methyl-4-piperidyl, 4-methyl-1-piperazinyl, 4-phenyl-1-piperazinyl, 4-benzyl-1-piperazinyl, 4-(2-hydroxyethyl)-1-piperazinyl, cis- and trans-2, 5=di-methyl-1-piperazinyl,2,3,5,6-tetramethyl-1-piperazinyl, and 3,5-dimethyl-1-piperazinyl; $R^2$ may be hydrogen, (lower) alkyl or phenyl(lower)alkyl, such as phenethyl; $n$ is an integer ranging from 0 to 4 and $m$ is 0 or 1. These compounds readily form pharmaceutically acceptable acid addition salts with acids such as hydrochloric, sulfuric, fumaric or maleic acids.

As used herein, the term "lower" refers to straight-chained and branched carbon units preferably having from 1 to 4 carbon atoms therein.

The intermediates occurring in the preparation of the present compounds have the formula:

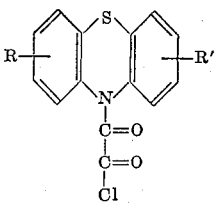

where R and R' are as above stated.

The reaction whereby the claimed compounds are obtained is illustrated below:

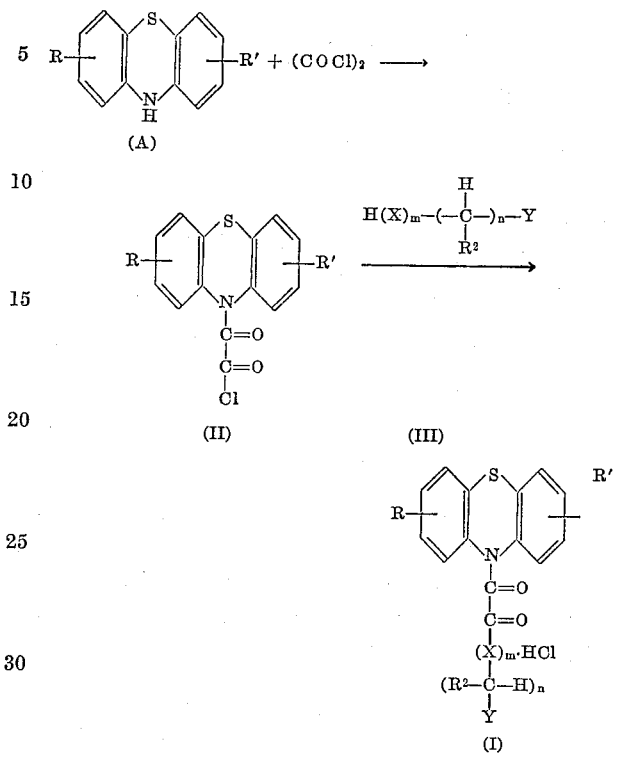

where the symbols R, R', $R^2$, X, Y, $n$ and $m$ are as above-stated.

In carrying out the reaction shown above a phenothiazine (A) is reacted with excess oxalyl chloride by refluxing for several hours to form the intermediate phenothiazine-10-glyoxyloyl chloride (II). Any excess oxolyl chloride remaining then is removed by vacuum distillation. The product crystallizes on standing. This product is reacted with substantially equimolar amounts of a compound of Formula III, preferably dissolved in an anhydrous solvent such as tetrahydrofuran, or ether. The reaction mixture is then heated to reflux to cause the final product (I) to precipitate. Where tetrahydrofuran has been used as the solvent, addition of ether following refluxing will cause precipitation of the product in the form of its hydrochloride salt. This salt can be converted to the free base form of the product in conventional manner. The free base in turn can be conventionally converted to its pharmaceutically acceptable acid addition salts.

The following examples illustrate but do not limit the invention.

Example 1.—2-chlorophenothiazine-10-glyoxyloyl chloride

A mixture of 2-chlorophenothiazine (10.00 g., 0.042 m.) and oxalyl chloride (40.0 g., 0.31 m.) is refluxed on the steam bath for three hours and the excess oxalyl chloride removed by distillation in vacuo. The residual greenish oil crystallizes on storage at room temperature. The residue is triturated with hexane and the grey-green solid collected by filtration; the yield is 12.6 g. (92.6%), M.P. 117–118° dec. (uncorr.). A sample for analysis was recrystallized from ether-pentane, colorless prisms, M.P. 116–117° dec. (uncorr.).

Analysis.—Calcd. for $C_{14}H_7Cl_2NO_2S$: C, 51.87; H, 2.17; Cl, 21.88; N, 4.32. Found: C, 52.07; H, 2.16; Cl, 21.7; N, 4.18.

Example 2

When 2,8-dibromophenothiazine is substituted for 2-chlorophenothiazine in the procedure of Example I, there is obtained 2,8-dibromophenothiazine-10-glyoxyloyl chloride.

*Example 3.—2-chloro-10[(2-dimethylamino-1-methylethoxy)glyoxyloyl]phenothiazine, hydrochloride*

A solution of 1-dimethylamino-2-propanol (1.59 g., 0.0154 m.) in anhydrous tetrahydrofuran (10 ml.) is added to a solution of 2-chlorophenothiazine-10-glyoxyloyl chloride (5.0 g., 0.0154 m.) in tetrahydrofuran (30 ml.). The mixture is refluxed for one hour, and anhydrous ether (30 ml.) added to complete precipitation of the product. The crude product 6.6 g. (100%), colorless crystals, M.P. 177–178.5° C. (uncorr.) is recrystallized from isopropyl alcohol, 4.77 g. (70.4%) colorless crystals, M.P. 188–188.5° (uncorr.).

*Analysis.*—Calcd. for $C_{18}H_{18}Cl_2N_2O_3S$: C, 53.40; H, 4.72; N, 6.56. Found: C, 53.47; H, 4.51; N, 6.46.

Example 4

When 2,8-dibromophenothiazine 10-glyoxyloyl chloride is treated by the method of Example 3, with 1-dipropylamino-2-butanol, the product is 2,8-dibromophenothiazine-10-glyoxylic acid-2-dipropylamino-1-ethylethyl ester.

*Example 5.—2-chloro-10[(2-dimethylaminoethoxy) glyoxyloyl]phenothiazine, hydrochloride*

A solution of 2-dimethylaminoethanol (0.45 g., 0.005 m.) in anhydrous ether (10 ml.) is added to a solution of 2-chlorophenothiazine-10-glyoxyloyl chloride (1.62 g., 0.005 m.) in anhydrous ether (25 ml.). The mixture was refluxed for one hour, and the crude product collected by filtration, washed with ether, dried at 50° C./house vac., yield 1.90 g. (91.7%), colorless crystals, M.P. 167.5–168.5° (uncorr.). Recrystallization of the crude product from ethanol-ethyl acetate affords 0.75 g. (34.2%), colorless crystals, M.P. 194.5–195° (uncorr.).

*Analysis.*—Calcd. for $C_{18}H_{18}Cl_2N_2O_3S$: C, 52.30; H, 4.39; N, 6.78. Found: C, 52.09; H, 4.33; N, 6.51.

*Example 6.—2-chloro-10[(4-methyl-1-piperazinyl) glyoxyloyl]phenothiazine hydrochloride*

The reaction of 2-chlorophenothiazine-10-glyoxyloyl chloride (1.62 g., 0.005 m.) with N-methylpiperazine (0.50 g., .005 m.) in a manner similar to that of Example 5 affords the title compound (0.84 g., 39.6%), colorless crystals from methanolethyl acetate, M.P. 310.5–314° C. (uncorr.).

*Analysis.*—Calcd. for $C_{19}H_{19}Cl_2N_3O_2S$: C, 53.78; H, 4.52; N, 9.90. Found: C, 53.97; H, 4.58; N, 9.64.

*Example 7.—2-chloro-10[(3-dimethylaminopropoxy) glyoxyloyl]phenothiazine, hydrochloride*

The reaction of 2-chlorophenothiazine-10-glyoxyloyl chloride (1.62 g., 0.005 m.) with 3-dimethylamino-1-propanol (0.52 g., 0.005 m.) in a manner similar to that of Example 5 yields the title compound (1.05, 49.1%), colorless crystals from methanolethyl-acetate, M.P. 171.5–173° C. (uncorr.).

*Analysis.*—Calcd. for $C_{19}H_{20}Cl_2N_2O_3S$: C, 53.40; H, 4.72; N, 6.56. Found: C, 53.58; H, 4.60; N, 6.30.

*Example 8.—2-chloro-10-[(4-phenyl-1-piperazinyl) glyoxyloyl]phenothiazine*

The reaction of 2-chlorophenothiazine-10-glyoxyloyl chloride (1.62 g., 0.005 m.) with 1-phenylpiperazine (0.81 g., 0.005 m.) in a manner similar to that of Example 3 gives the title compound (1.28 g., 52.7%) as the free base, colorless crystals from ethanol-water, M.P. 189–191° C. (uncoor.).

*Analysis.*—Calcd. for $C_{24}H_{20}ClN_3O_2S$: C, 64.06; H, 4.47; N, 9.35. Found: C, 63.71; H, 4.40; N, 9.47.

*Example 9.—2-chloro-10[(1-methyl-4-piperidoxy) glyoxyloyl]phenothiazine, hydrochloride*

The reaction of 2-chlorophenothiazine-10-glyoxyloyl chloride (5.00 g., 0.0154 m.) with 4-hydroxyl-1-methylpiperidine (1.77 g., 0.0154 m.) in a manner similar to that of Example 3 yields the title compound (3.1 g., 45.8%), colorless crystals from methanol-ethyl acetate, M.P. 227–228° S. (uncorr.).

*Analysis.*—Calcd. for $C_{20}H_{20}Cl_2N_2O_3S$: C, 54.69; H, 4.57; N, 6.38; Cl, 16.14. Found: C, 54.98; H, 4.71; N, 6.13; Cl, 16.12.

*Example 10.—2-chloro-N-(2-dimethylaminoethyl)phenothiazine-10-glyoxylamide hydrochloride*

The reaction of 2-chlorophenothiazine-10-glyoxyloyl chloride (5.00 g., 0.0154 m.) with N,N-dimethylethylenediamine (1.36 g., 0.0154 m.) in a manner similar to that of Example 3 affords the title compound (3.8 g., 59.7%), colorless crystals from methanol-ethyl acetate, M.P. 220–221.5° C. (uncorr.).

*Analysis.*—Calcd. for $C_{18}H_{19}Cl_2N_3O_2S$: C, 52.43; H, 4.65; N, 10.20. Found: C, 52.35; H, 5.04; N, 10.13.

*Example 11.—2-chloro-10-[4-(2-hydroxyethyl)-1-piperazinylglyoxyloyl] phenothiazine hydrochloride*

The reaction of 2-chlorophenothiazine-10-glyoxyloyl chloride (5.00 g., 0.0154 m.) with 1-β-hydroxyethylpiperazine (2.2 g., 0.0154 m.) in a manner similar to that of Example 3 gives the title compound (1.3 g., 18.1%), colorless crystals from methanol-ethyl acetate, M.P. 260.5–261.5° C. (uncorr.).

*Analysis.*—Calcd. for $C_{20}H_{21}Cl_2N_3O_3S$: C, 52.88; H, 4.66; N, 9.25. Found: C, 53.08; H, 4.78; N, 8.80.

*Example 12.—2-propionyl-10-[(4-methyl-1-piperazinyl)-glyoxyloyl] phenothiazine hydrochloride*

The reaction of 2-chlorophenothiazine-10-glyoxyloyl chloride (5.00 g., 0.0145 m.) with 1-methylpiperazine (1.45 g., 0.0145 m.) in a manner similar to that of Example 3, yields the title compound (4.1 g., 63.6%), colorless crystals from 95% isopropyl alcohol, M.P. 266–267° C. (uncorr.).

*Analysis.*—Calcd. for $C_{22}H_{24}ClN_3O_3S$: C, 59.25; H, 5.43; N, 9.43. Found: C, 59.54; H, 5.36; N, 9.14.

*Example 13.—2-propionylphenothiazine-10-glyoxyloyl chloride*

The reaction of 2-propionylphenothiazine (50.0 g., 0.196 m.) with oxalyl chloride (100 g., 0.788 m.) in a manner similar to that of Example 1, affords the title compound (45.0 g., 66.5%), yellow crystals from benzene, M.P. 173–174° C. (uncorr.).

*Analysis.*—Calcd. for $C_{17}H_{12}ClN_3OS$: C, 59.04; H, 3.50; N, 4.05; Cl, 10.27. Found: C, 59.23; H, 3.44; N, 4.04; Cl, 10.24.

*Example 14.—Phenothiazine-10-glyoxyloyl chloride*

The reaction of phenothiazine (75.0 g., 0.376 m.) with oxalyl chloride (100 g., 0.788 m.) in a manner similar to that of Example 1, affords the title compound (55.0 g., 50.5%), yellow crystals from cyclohexane, M.P. 91.5–92.0° C. (uncorr.).

*Analysis.*—Calcd. for $C_{14}H_8ClNO_2S$: C, 58.01; H, 2.79; N, 4.84. Found: C, 57.77; H, 2.72; N, 5.18.

*Example 15.—2-propionyl-10-[(4-phenyl-1-piperazinyl)-glyoxyloyl] phenothiazine hydrochloride*

The reaction of 2-propionylphenothiazine-10-glyoxyloyl chloride (5.00 g., 0.0145 m.) with 1-phenylpiperazine (2.35 g., 0.0145 m.) in a manner similar to that of Example 3, gives the title compound (3.96 g., 52.8%), colorless crystals from methanol-ethyl acetate, M.P. 195° C. (uncorr.).

Analysis.—Calcd. for $C_{27}H_{26}ClN_3O_3S$: C, 63.83; H, 5.16; N, 8.27. Found: C, 63.76; H, 5.09; N, 8.06.

*Example 16.—2-propionyl-10-[4-(2-hydroxyethyl)-1-piperazinylglyoxyloyl] phenothiazine hydrochloride*

The reaction of 2-propionylphenothiazine-10-glyoxyloyl chloride (5.00 g., 0.0145 m.) with 1-β-hydroxyethylpiperazine (1.91 g., 0.0145 m.) in a manner similar to that of Example 3, yields the title compound (4.88 g., 69.7%), colorless crystals from methanol ethyl acetate, M.P. 238–240° C. (uncorr.).

Analysis.—Calcd. for $C_{23}H_2ClN_3O_4S$: C, 58.03; H, 5.51; N, 8.83. Found: C, 57.80; H, 5.52; N, 8.74.

*Example 17.—10-[4-phenyl-1-piperazinyl)glyoxyloyl]-phenothiazine hydrochloride, isopropyl alcoholate*

The reaction of phenothiazine-10-glyoxyloyl chloride (5.00 g., 0.0172 m.) with 1-phenylpiperazine (2.75 g., 0.0172 m.) in a manner similar to that of Example 3, affords the title compound (4.00 g., 51.6%), colorless crystals from isopropyl alcohol-ethyl acetate, M.P. 143° C. (uncorr.). The product crystallizes with one mole of isopropyl alcohol.

Analysis.—Calcd. for $C_{24}H_{22}ClN_3O_2S \cdot C_3H_8O$: C, 63.33; H, 5.9; N, 8.21. Found: C, 63.42; H, 6.07; N, 8.48.

*Example 18.—10-[(2,3,5,6-tetramethyl-1-piperazinyl)-glyoxyloyl] phenothiazine hydrochloride*

The reaction of phenothiazine-10-glyoxyloyl chloride (5.00 g., 0.0172 m.) with 2,3,5,6-tetramethylpiperazine (2.44 g., 0.0172 m.) in a manner similar to that of Example 3, gives the title compound (3.50 g., 47.1%), colorless crystals from acetic acid, M.P. 315° C. (uncorr.).

Analysis.—Calcd. for $C_{22}H_{26}ClN_3O_2S$: C, 61.16; H, 6.07; N, 9.73. Found: C, 61.17; H, 5.92; N, 9.80.

*Example 19.—10-[(4-benzyl-1-piperazinyl)glyoxyloyl] phenothiazine hydrochloride*

The reaction of phenothiazine-10-glyoxylol chloride (5.00 g., 0.0172 m.) with 1-benzylpiperazine (3.04 g., 0.0172 m.) in a manner similar to that of Example 3, yields the title compound (2.30 g., 28.6%), colorless crystals from isopropyl alcohol, M.P. 236.5–237° C. (uncorr.).

Analysis.—Calcd. for $C_{25}H_{24}ClN_3O_2S$: C, 64.43; H, 5.19; N, 9.02; Cl, 7.61. Found: C, 64.12; H, 5.25; N, 8.90; Cl, 7.90.

*Example 20.—2-trifluoromethylphenothiazine-10-glyoxyloyl chloride*

The reaction of 2-trifluoromethylphenothiazine (75.0 g., 0.28 m.) with oxalyl chloride (71.0 g., 0.56 m.) in a manner similar to that of Example 1, except that benzene (100 ml.) is used as solvent, affords the title compound (75 g., 75.0%), crystals from hexane, M.P. 88–88.5° C. (uncorr.).

Analysis.—Calcd. for $C_{15}H_7ClF_3NO_2S$: C, 50.39; H, 1.97; Cl, 9.90. Found: C, 50.72; H, 1.99; Cl, 9.50.

*Example 21*

Reaction of 3-trifluoromethylphenothiazine with oxalyl chloride as in Example 1, yields 3-trifluoromethylphenothiazine-10-glyoxyloyl chloride.

*Example 22.—10-[(4-methyl-1-piperazinyl)glyoxyloyl] phenothiazine hydrochloride*

The reaction of phenothiazine-10-glyoxyloyl chloride (5.00 g., 0.0172 m.) with 1-methylpiperazine (1.72 g., 0.0172 m.) in a manner similar to that of Example 3, gives the title compound (4.03 g., 60.0%), colorless crystals from isopropyl alcohol, M.P. 277–278° C. (uncorr.).

Analysis.—Calcd. for $C_{19}H_{20}ClN_3O_2S$: C, 58.52; H, 5.18; N, 10.70; Cl, 9.09. Found: C, 58.25; H, 5.39; N, 10.70; Cl, 9.20.

*Example 23.—10-[(3,5-dimethyl-1-piperazinyl)glyoxyloyl]phenothiazine hydrochloride*

The reaction of phenothiazine-10-glyoxyloyl chloride (5.00 g., 0.0172 m.) with 2,6-dimethylpiperazine (1.97 g., 0.0172 m.) in a manner similar to that of Example 3, yields the title compound (1.38 g., 19.6%), colorless crystals from isopropyl alcohol, M.P. 289–290° C. (uncorr.).

Analysis.—Calcd. for $C_{20}H_{22}ClN_3O_2S$: C, 59.47; H, 5.49; N, 10.40; Cl, 8.78. Found: C, 59.03; H, 5.82; N, 10.40; Cl, 8.78.

*Example 24.—2-chloro-10-[(3,5-dimethyl-1-piperazinyl)glyoxyloyl]phenothiazine hydrochloride*

The reaction of 2-chlorophenothiazine-10-glyoxyloyl chloride (5.00 g., 0.0154 m.) with 2,6-dimethylpiperazine (1.73 g., 0.015 m.) in a manner similar to that of Example 3, affords the title compound (3.45 g., 51.2%), colorless crystals from isopropyl alcohol, M.P. 300° C. (uncorr.).

Analysis.—Calcd. for $C_{20}H_{21}Cl_2N_3O_2S$: C, 54.80; H, 4.83; N, 9.58; Cl, 16.18. Found: C, 54.90; H, 5.21; N, 9.41; Cl, 15.62.

*Example 25.—10-[(4-methyl-1-piperazinyl)glyoxyloyl]-2-trifluoromethylphenothiazine hydrochloride*

The reaction of 2-trifluoromethylphenothiazine-10-glyoxyloyl chloride (5.00 g., 0.014 m.) with 1-methylpiperazine (1.42 g., 0.014 m.) in a manner similar to that of Example 3, gives the title compound (2.07 g., 32.2%), colorless crystals from isopropyl alcohol, M.P. 289–290° C. (uncorr.).

Analysis.—Calcd. for $C_{20}H_{19}ClF_3N_3O_2S$: C, 52.46; H, 4.18; N, 9.18. Found: C, 52.60; H, 4.45; N, 9.49.

*Example 26.—10-[(4-benzyl-1-piperazinyl)glyoxyloyl]-2-trifluoromethylphenothiazine hydrochloride*

The reaction of 2-trifluoromethylphenothiazine-10-glyoxyloyl chloride (5.00 g., 0.014 m.) with 1-benzylpiperazine (2.47 g., 0.014 m.) in a manner similar to that of Example 3, yields the title compound (2.75 g., 36.8%), colorless crystals from isopropyl alcohol, M.P. 219–220° C. (uncorr.).

Analysis.—Calcd. for $C_{26}H_{23}ClF_3N_3O_2S$: C, 58.48; H, 4.34; N, 7.87. Found: C, 58.63; H, 4.55; N, 7.89.

*Example 27*

Reaction of 3-trifluoromethylphenothiazine-10-glyoxyloyl chloride with 1-benzylpiperazine, as in Example 3, yields 10-[(4-benzyl-1-piperazinyl)glyoxyloyl]-3-trifluoromethylphenothiazine.

When oxalyl chloride is reacted with the phenothiazine derivatives (1) listed below as in the previous examples the intermediates listed below are obtained. Reaction of said intermediates with the other listed reactants (2) according to the previous examples yields the final products hereinafter set forth.

| Reactants | Intermediates | Final Products |
|---|---|---|
| (1) 2-butylphenothiazine<br>(2) 1-diethylaminobutanol | 2-butylphenothiazine-10-glyoxyloylchloride | 2-butylphenothiazine-10-gyloxylic acid, 4-diethylaminobutyl ester. |
| (1) 3-phenethylphenothiazine<br>(2) 2-diethylaminoethanethiol | 3-phenethylphenothiazine-10-glyoxyloyl chloride | 3-phenethylphenothiazine-10-glyoxylic acid, 2-(diethylamino) thioethyl ester. |
| (1) 2-cyanophenothiazine<br>(2) 2,2-dimethylamino-1-phenethylethanol | 2-cyanophenothiazine-10-glyoxyloyl chloride | 2-cyanophenothiazine-10-glyoxylic acid, (2,2-dimethylamino-1-phenyl) ethyl ester. |
| (1) 2-carbomethoxy phenothiazine<br>(2) 1-methyl piperazine | 2-carbomethoxy phenothiazine-10-glyoxyloyl chloride. | 2-carbomethoxy-10-[(4-methyl-1-piperazinyl)glyoxyloyl]phenothiazine. |
| (1) 2-carbobutoxy phenothiazine<br>(2) 1-methyl piperazine | 2-carbobutoxy phenothiazine-10-glyoxyloyl chloride. | 2-carbobutoxy-10[(4-methyl-1-piperazinyl)glyoxyloyl]phenothiazine. |
| (1) 2-Sulfamyl phenothiazine<br>(2) 4-hydroxy-1-methylpiperazine | 2-Sulfamyl phenothiazine-10-glyoxyloyl chloride | 2-sulfamyl-phenothiazine-10-glyoxylic acid, 1-methyl-4-piperidyl ester. |
| (1) 2-acetylamino phenothiazine<br>(2) 1-methylpiperazine | 2-acetylamino phenothiazine-10-glyoxyloyl chloride. | 2-acetylamino-10-[(4-methyl-1-piperazinyl)glyoxyloyl] phenothiazine. |
| (1) 2-butyrylamino phenothiazine<br>(2) 1-methyl piperazine | 2-butyrylamino phenothiazine. | 2-butyrylamino-10-[(4-methyl-1-piperazinyl)glyoxyloyl]phenothiazine. |
| (1) 2-methoxyphenothiazine<br>(2) 1-methylpiperazine | 2-methoxyphenothiazine-10-glyoxyloyl chloride. | 2-methoxy-10-[(4-methyl-1-piperazinyl)glyoxyloyl]phenothiazine. |
| (1) 2-butoxyphenothiazine<br>(2) 1-methylpiperazine | 2-butoxyphenothiazine-10-glyoxyloyl chloride. | 2-butoxy-10-[(4-methyl-1-piperazinyl)glyoxyloyl]phenothiazine. |
| (1) 2-butyryl-8-chlorophenothiazine<br>(2) 1-phenylpiperazine | 2-butyryl-8-chlorophenothiazine-10-glyoxyloyl chloride. | 2-butyryl-8-chloro-10-[(4-phenyl-1-piperazinyl)glyoxyloy]phenothiazine. |
| (1) 2-dimethylaminophenothiazine<br>(2) 1-phenyl piperazine | 2-dimethylaminophenothiazine-10-glyoxyloyl chloride. | 2-dimethylamino-10-[(4-phenyl-1-piperazinyl)-glyoxyloyl]phenothiazine. |
| (1) 2-dibutylamino phenothiazine<br>(2) 1-phenyl piperazine | 2-dibutylamino phenothiazine-10-glyoxyloyl chloride. | 2-dibutylamino-10-[(4-phenyl-1-piperazinyl)-glyoxyloyl]phenothiazine. |
| (1) 2-dipropylamino phenothiazine<br>(2) cis-2,5-dimethyl piperazine | 2-dipropylamino phenothiazine-10-glyoxyloyl chloride. | 2-dipropylamino-10-[(cis-2,5-dimethyl-1-piperazinyl)glyoxyloyl]phenothiazine. |
| (1) 2-ethoxyphenothiazine<br>(2) trans-2,5-dimethyl piperazine | 2-ethoxyphenothiazine-10-glyoxyloyl chloride. | 2-ethoxy-10-[(trans-2,5-dimethyl-1-piperazinyl)-glyoxyloyl]phenothiazine. |
| (1) 2-propoxyphenothiazine<br>(2) Ammonia | 2-propoxyphenothiazine-10-glyoxyloyl chloride. | 2-propoxyphenothiazine-10-glyoxamide. |
| (1) 2-trifluoromethyl phenothiazine<br>(2) Diethylamine | 2-trifluoromethyl phenothiazine-10-glyoxyloyl chloride. | N,N-diethyl-2-trifluoromethylphenothiazine-10-glyoxamide. |
| (1) 2-methylphenothiazine<br>(2) Dibutylamine | 2-methylphenothiazine-10-glyoxyloyl chloride. | N,N-dibutyl-2-methylphenothiazine-10-glyoxamide. |
| (1) 2-methylphenothiazine<br>(2) N,N'-dimethylethylenediamine | 2-methylphenothiazine-10-glyoxyloyl chloride. | N-methyl-N'-dimethylaminoethyl-2-methylphenothiazine-10-glyoxamide. |
| (1) 2-methylphenothiazine<br>(2) N,N'-dibutylethylene diamine | 2-methylphenothiazine-10-glyoxyloyl chloride. | N-butyl-N'-butylaminoethyl-2-methylphenothiazine-10-glyoxamide. |

The compounds of this invention can be administered with pharmaceutically acceptable inert carriers in a wide variety of oral or parenteral unit dosage forms containing 25, 100, 250 or 500 mg. of active ingredients for the symptomatic adjustment of the dosage to the individual patient, or in admixture with other active compounds.

The present invention also includes the process of bringing the compounds thereof into a form suitable for therapeutic administration by associating them with liquid or solid, pharmaceutically acceptable carriers.

What is claimed is:
1. A compound having the formula:

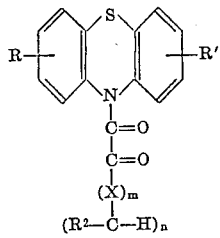

wherein: R and R' are selected from the group consisting of hydrogen, (lower) alkanoyl, (lower)alkyl, phenyl (lower) alkyl, halogen, (lower)alkoxy, halo(lower)alkyl, sulfamyl, carbalkoxy having up to 4 carbon atoms, cyano, di(lower)alkylamino, (lower)alkanoylamino; X is selected from the group of oxygen, imino, (lower)alkylimino and sulfur; Y is selected from the group of amino, di(lower)alkylamino, di(lower)alkylamino(lower)alkyl, 1-methyl-4-piperidyl, 4-methyl-1-piperazinyl, 4-phenyl-1-piperazinyl, 4-benzyl-1-piperazinyl, 4-(2-hydroxyethyl)-1-piperazinyl, 2,3,5,6-tetramethyl-1-piperazinyl, 3,5-dimethyl-1-piperazinyl, cis- and trans-2,5-dimethyl-1-piperazinyl; $R^2$ is selected from the group consisting of hydrogen, (lower)alkyl and phenyl(lower)alkyl, $n$ is an integer ranging from 0 to 4, $m$ is an integer ranging from 0 to 1 and the pharmaceutical acid addition salt thereof.

2. A compound of the formula:

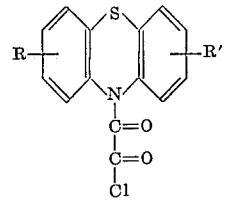

wherein R and R' are as defined in claim 1.
3. 2-chlorophenothiazine-10-glyoxyloyl chloride.
4. 2-chloro-10[(4-methyl - 1 - piperazinyl)glyoxyloyl]phenothiazine.
5. 2-chloro-10-[(-4-phenyl - 1 - piperazinyl)glyoxyloyl]phenothiazine.
6. 2 - chloro-N-(2-dimethylaminoethyl)phenothiazine-10-glyoxlamide.
7. 2 - chloro-10-[4-2-(hydroxyethyl - 1 - piperazinyl)glyoxyloyl]phenothiazine.
8. 2-propionyl-10-[(4-methyl - 1 - piperazinyl)glyoxyloyl]phenothiazine.
9. 2-propionylphenothiazine-10-glyoxyloyl chloride.
10. Phenothiazine-10-glyoxyloyl chloride.
11. 2 - propionyl-10-[(4-phenyl - 1 - piperazinyl)glyoxyloyl]phenothiazine.
12. 2-propionyl-10-[4-(2-hydroxyethyl) - 1 - piperazinyl-glyoxyloyl]phenothiazine.
13. 10-[4-(phenyl - 1 - piperazinyl)glyoxyloyl]phenothiazine, isopropyl alcoholate.
14. 10-[(2,3,5,6-tetramethyl - 1 - piperazinyl)glyoxyloyl]phenothiazine.
15. 10-[(4-benzyl - 1 - piperazinyl)glyoxyloyl]phenothiazine.
16. 2 - trifluoromethylphenothiazine - 10 - glyoxyloyl chloride.

17. 10[(4-methyl - 1 - piperazinyl)glyoxyloyl]phenothiazine.

18. 10 - [3,5 - dimethyl - 1 - piperazinyl)glyoxyloyl] phenothiazine.

19. 2 - chloro-10-[(3,5-dimethyl - 1 - piperazinyl)glyoxyloyl]phenothiazine.

20. 10[(4-methyl - 1 - piperazinyl)glyoxyloyl]-2-trifluoromethylphenothiazine.

21. 10-[(4-benzyl - 1 - piperazinyl)glyoxyloyl[-2-trifluoromethylphenothiazine.

22. N,N-diethyl - 2 - trifluoromethylphenothiazine-10-glyoxamide.

23. 2-chloro-10[(2-dimethylamino - 1 - methylethoxy) glyoxyloyl]phenothiazine.

24. 2 - chloro-10[(2-dimethylaminoethoxy)glyoxyloyl] phenothiazine.

25. 2-chloro - 10[(3 - dimethylaminopropoxy)glyoxyloyl]phenothiazine.

26. 2-chloro-10[(1-methyl - 4 - piperidoxy)glyoxyloyl] phenothiazine.

No references cited.

WALTER A. MODANCE, *Primary Examiner.*

HARRY I. MOATZ, *Assistant Examiner.*